US006301126B1

(12) United States Patent
Smith

(10) Patent No.: US 6,301,126 B1
(45) Date of Patent: *Oct. 9, 2001

(54) ELECTRICAL EQUIPMENT HOUSING SAFETY INTERLOCK SYSTEM

(75) Inventor: Timothy J. Smith, Minneapolis, MN (US)

(73) Assignee: Honeywell International Inc., Morristown, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/335,390

(22) Filed: Jun. 17, 1999

(51) Int. Cl.[7] .................................................. H02B 1/10

(52) U.S. Cl. ........................ 361/826; 361/827; 261/26; 261/29

(58) Field of Search .................................. 361/826, 827, 361/600; 261/26, 29, 106

(56) References Cited

U.S. PATENT DOCUMENTS

| | | | | |
|---|---|---|---|---|
| 4,912,747 | | 3/1990 | Sakama et al. . | |
| 5,108,663 | * | 4/1992 | Chiu | 261/26 |
| 5,212,624 | | 5/1993 | Johnson et al. . | |
| 5,252,260 | | 10/1993 | Schuman . | |

FOREIGN PATENT DOCUMENTS

| | | |
|---|---|---|
| 0187221A3 | 1/1998 | (EP) . |

* cited by examiner

*Primary Examiner*—Leo P. Picard
*Assistant Examiner*—Hung Van Duong

(57) ABSTRACT

A housing for electrical equipment has first and second halves. An electrical connecting plug between the housing halves is arranged to require halves of the plug to be separated before the housing halves can be separated.

6 Claims, 2 Drawing Sheets

ELECTRICAL EQUIPMENT HOUSING SAFETY INTERLOCK SYSTEM

BACKGROUND OF THE INVENTION

There are many types of electrical devices operating on line power whose housing must be opened at times for servicing and replacing parts. There is always a concern that these devices will be opened without first removing the power by unplugging the power cord or tripping the circuit breaker. Television sets for example having removable back covers incorporate plugs in the back covers. The plug in the cover is designed to mate with a plug in the chassis when the cover is assembled to the set. In this way, power automatically disconnects when the cover is removed. In such a device, power is supplied to the back cover by the power cord but no electrical component is present in the back cover which uses this power.

There are other devices though whose housings are formed of two halves, where it is a design convenience to supply line power directly to the half which has a component operated by line power. As one example, some humidifiers designed for permanent attachment in ductwork have in a removable housing cover, a fan which operates on line power. A base with which the cover mates is permanently installed in the duct. A transformer in the cover steps down line voltage to 24 v. to operate a solenoid valve in the base for regulating water flow to the humidifier, and for connection to the humidistat. The humidistat completes the 24 v. circuit, powering the solenoid and operating a relay which controls fan power. It is necessary to regularly replace a pad onto which the water is dispensed while the humidifier is operating. Replacing this pad requires the humidifier housing to be opened. This operation is safer if the fan is disabled while the housing is open.

U.S. Pat. No. 5,252,260, which issued to Schuman on Oct. 12, 1993, describes a humidifier including an internal connector plug having first and second halves which are integrated into the humidifier's cover and base respectively. When the cover is mated to the base, the two connector plug halves are mated automatically to form the electrical connections which allow operation of the humidifier. I hereby incorporate by reference the '260 patent into this application.

BRIEF DESCRIPTION OF THE INVENTION

I have developed a variation on the Schuman design which uses externally accessible plug halves and housing halves which do not allow the plug halves to be mated until the housing halves have been properly mated. Such an electrical equipment housing has conventional first and second housing halves. The second housing half is conformed to mate with the first housing half to define an enclosed space. An electrical device is mounted on one of the housing halves so as to be within the enclosed space when the housing halves are mated. A power terminal mounted on one of the housing halves and exterior to the enclosed space when the housing halves are mated, allows connection of the electrical device to a power source. The power terminal may be no more than a power cord for plugging into a conventional receptacle. The device and the power terminal will be defined in the following description on occasion as first and second electrical components.

The housing includes a power supply assembly for conditioning supply of power from the power terminal to the component on proper mating of the housing halves. This assembly comprises an interconnection plug comprising first and second plug halves. These plug halves each carry a number of individual conductors which are intended to electrically connect when the plug halves are mated with each other. A flexible first power cable is electrically and mechanically connected at a first end to the first plug half and at a second end, mechanically to the exterior of the first housing half. The first plug half dangles freely on the flexible power cable from the exterior of the first housing half. A second power cable is mechanically and electrically attached to the second plug half. The second plug half is mechanically attached to the second housing half and accessible from the exterior of the second housing half. The first power cable length and the attachment of the first power cable to the first housing half and the attachment of the second plug half to second housing half allows mating of the plug halves when the housing halves are properly mated. The first and second power cables and the first and second plug halves cooperatively form electrical connection between the first and second electrical components when the first and second plug halves are mated.

In one form of this invention, the second plug half is mounted in the second housing half and accessible from the exterior of the housing. The first housing half includes a surface carrying an aperture in alignment with the second plug half when the housing halves are mated, and wherein the plug halves are mated with the first plug half passing through the aperture.

DESCRIPTION OF THE PREFERRED EMBODIMENT

Figure 1:
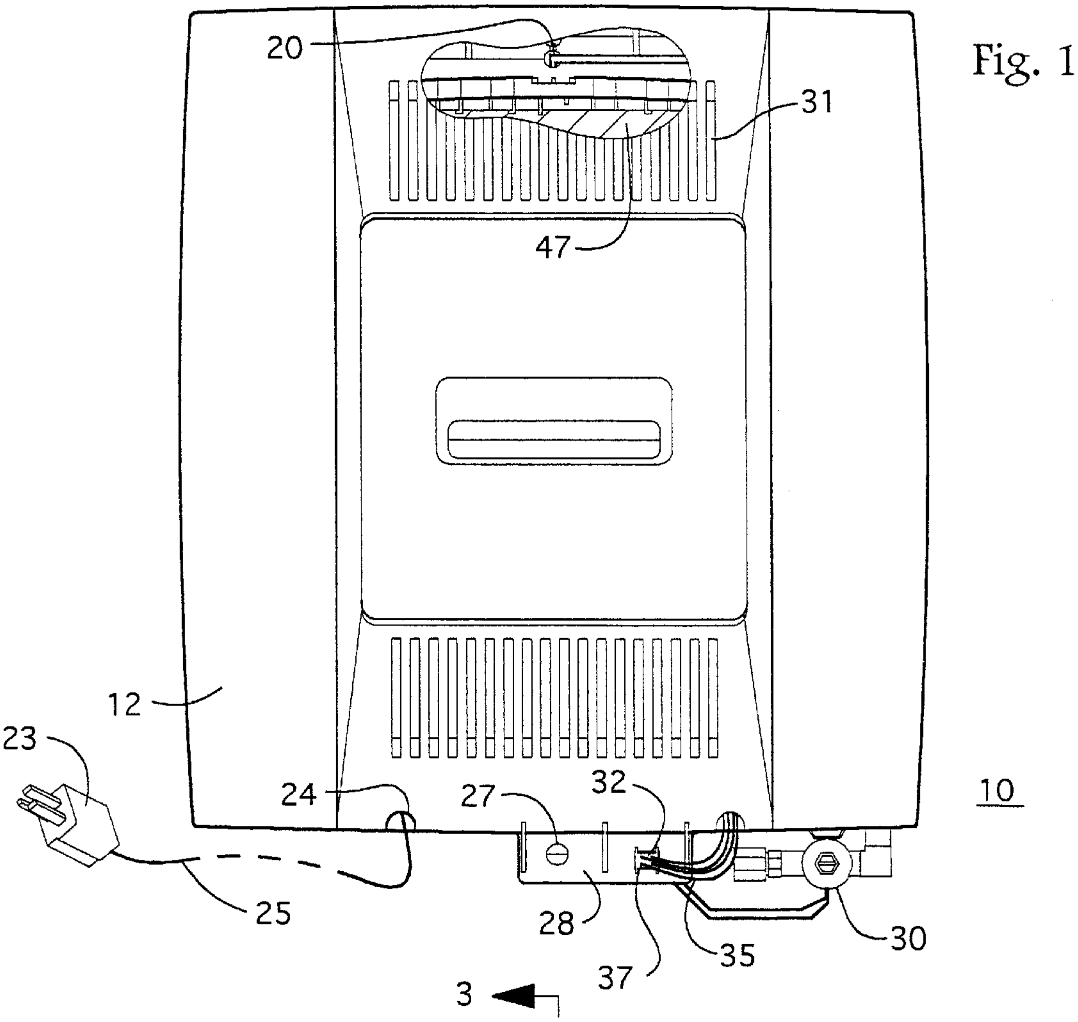
FIG. 1 is a front elevation view of a humidifier incorporating the invention.
Figure 2:
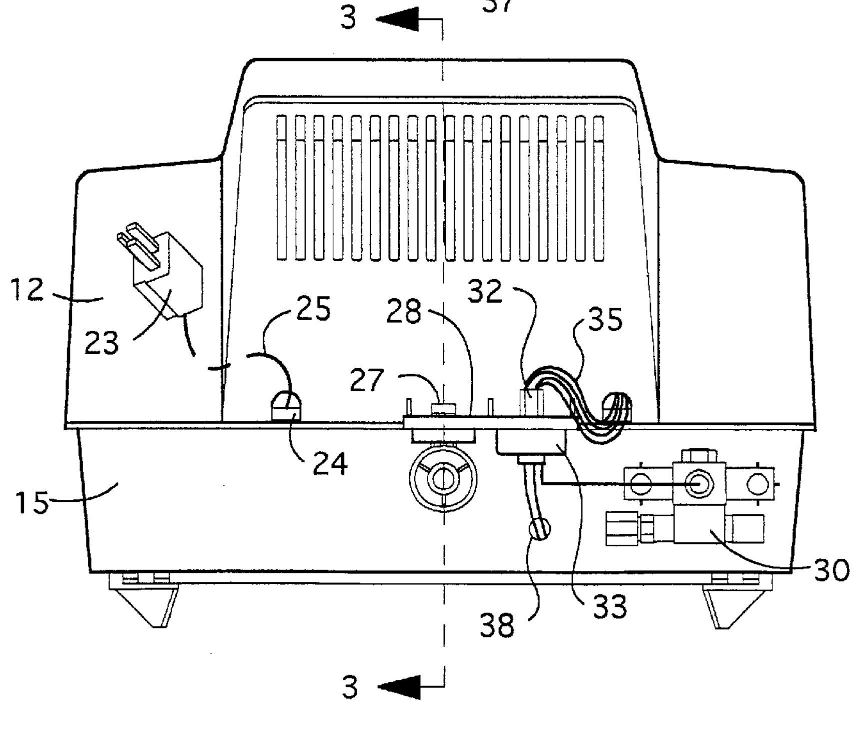
FIG. 2 is a bottom elevation view of a humidifier incorporating the invention.
Figure 3:
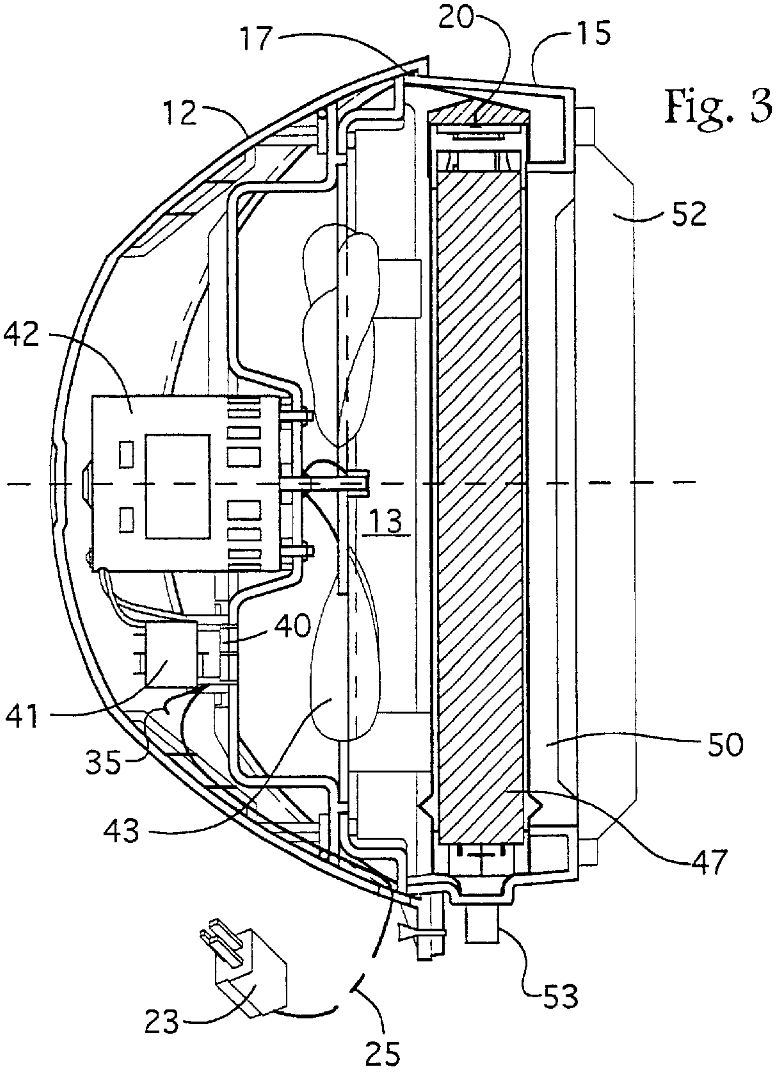
FIG. 3 is a side section view of a humidifier incorporating the invention.

Although my invention is suitable for a wide range of electrical equipment housings, I will describe it as deployed in a powered humidifier 10 shown in FIGS. 1–3. Humidifier 10 is designed for mounting in the wall of a conventional air plenum. In such a conventional form, humidifier 10 comprises a cover 12 forming a first housing half and a base 15 forming a second housing half. FIGS. 2 and 3 show these housing halves in a mated position defining an enclosed space as at 13. A series of tabs at 17 (FIG. 3) and a machine screw 27 (FIGS. 1 and 2) cooperate to lock cover 12 and base 15 together. Screw 27 is carried in a projecting flange 28 completely external to the enclosed space 13. Base 15 also includes a projecting flange 52 which is intended to enter and mount more or less permanently in an opening cut in the wall of a furnace plenum. The part of the enclosed space 13 indicated at 50 is in direct flow communication with such a furnace plenum once the humidifier 10 is so mounted. FIGS. 1 and 3 show humidifier 10 in its necessary mounting orientation.

Cover 12 carries a motor 42 driving a fan 43 which draws air from the plenum into space 50 and then through a porous block or pad 47 into the enclosed space 13. A nozzle 20 receiving water under the control of a solenoid valve 30 provides a slow flow of water to the top surface of block 47. This water flows slowly under the influence of gravity through block 47 saturating it. Air flowing through block 47 under the force of fan 43 vaporizes some of this water, and thereby gains humidity. Fan 43 forces this humidified air back into the plenum through areas of space 13 adjacent to block 47. This air returned to the plenum mixes with other air flowing in the plenum, increasing the overall humidity of the plenum air flow. Water provided to block 47 and not vaporized by the air flow through block 47 eventually drains to the bottom of block 47 and leaves the enclosed space 13 through a drain 53.

Motor 42 operation is controlled by a circuit board 40. Motor 42 typically operates on line voltage, whereas valve 30 operates on 24 v. provided by a transformer 41 carried on circuit board 40. Circuit board 40 receives line voltage from a power cord 25 which is routed through the interior space of cover 12. Power cord 25 enters cover 12 through an opening 24 in cover 12. Power cord 25 is terminated at the outside end by a standard electrical plug 23 for connecting to a standard 110 v. receptacle. A relay carried on circuit board 40 switches power to motor 42. The relay winding operates on the 24 v. transformer output. The transformer 41 primary and motor 42 are the only components within humidifier 10 which operate at line voltage.

It is necessary on occasion to replace block 47 because minerals carried in the water supplied by nozzle 20 accumulate in block 47, reducing its efficiency. Replacing block 47 of course requires that cover 12 be separated from base 15. Recall that humidifier 10 is placed in service by mounting base 15 in the wall of a plenum, from which wall base 15 is extremely inconvenient to remove. Cover 12 is on the other hand, quite easy to detach from base 15. However, when cover 12 is removed, the blades of fan 43 are exposed. These blades could pose a hazard should the motor 42 run or start to run while the cover 12 is separated from base 15. Accordingly, it is useful to provide some sort of interlock or disconnect which disables motor 42 from operating while cover 12 is separated from base 15. '260 solves this problem with an interconnection plug whose halves are mounted in the cover and base, so that separating the cover from the base automatically removes power from the winding of the relay controlling power flow to the motor.

In my embodiment, I use an external interconnection plug comprising a first plug half 32 electrically connected to circuit board 40 through a flexible electrical cable 35, only the two ends of which are shown. Cable 35 is routed through the interior space of cover 12. Cable 35 also mechanically connects plug half 32 to cover 12, with plug half 32 dangling from the end of cable 35. A second plug half 33 is mounted on the exterior of base 15 adjacent to a flange 28 of cover 12. In my embodiment, there are first through sixth separate conductors in cable 35 and first through sixth connection elements in each of the plug halves 32 and 33. Plug halves 32 and 33 are configured to mate with each other so that the first through sixth connection elements in first plug half 32 are connected to the respective connection elements in plug half 33. When cover 12 is mated with base 15, an aperture 37 in flange 28 is aligned with second plug half 33. Plug half 32 can mate through aperture 37 with plug half 33 to form the connection between the individual connection element pairs. Two of these connection element pairs control flow of power to motor 42 by controlling flow of power to the control winding of the relay. These two connection elements in plug half 33 are connected to wires 38 in FIG. 2. Wires 38 are intended for connection to a humidistat, whose switch when closed allows power to flow to the relay control winding. Plug half 32 is designed with a feature to be described later which interferes with the edges of aperture 37 to oppose any attempt to separate cover 12 from base 15 until plug half 32 is unmated from plug half 33.

While plug half 33 is shown as integral with or mounted on base 15, this is not necessary. Plug half 33 can be electrically connected by a flexible cable as is plug half 32, and the two plug halves 32 and 33 simply mated and allowed to dangle. The flexible cables should be of a length which opposes any separation of cover 12 and base 15 until the plug halves 32 and 33 are separated. No matter what the specifics are for the design of plug halves 32 and 33 and their electrical connection, the cable for plug half 32 and the mounting for plug half 33 should be designed to make the mating of plug halves 32 and 33 as inconvenient as possible when cover 12 and base 15 are not normally mated. This deters people from providing power to motor 42 by mating plug halves 32 and 33 while cover 12 and base 15 are separated.

Figure 4:
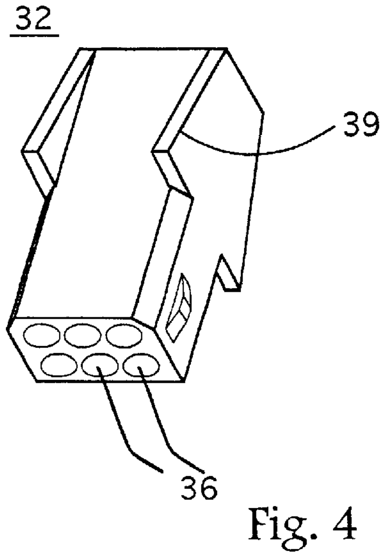
FIG. 4 is a magnified perspective view of a preferred configuration for a plug half.

The embodiment of plug half 32 shown in FIG. 4 shows two holes 36 of six total in the commercial embodiment, which house the first plug half 32 connection elements. Plug half 33 includes projecting conductors intended to enter these holes 36 to form the connections between the respectively conductors. Plug half 32 also includes four similarly profiled shoulders 39 which are intended to extend over the flange 28 in interfering relationship with the edges of aperture 37 when plug halves 32 and 33 are mated. The intent is to prevent separating cover 12 from base 15 without first completely separating plug halves 32 and 33.

In further variations on this design, it is possible to orient plug halves 32 and 33 and flange 28 in a variety of ways so that plug half 32 can actually serve to pin or lock cover 12 in its mated position with base 33. In such an arrangement, a flange is oriented perpendicular. Thus configured, cover 12 and base 15 cannot be separated until plug halves 32 and 33 are separated.

The preceding has described my invention. I wish to claim this invention by the following:

1. An electrical equipment housing of the type having first and second housing halves, said second housing half conformed to mate with the first housing half to define an enclosed space, an electrical device mounted on one of the housing halves and within the enclosed space when the housing halves are mated, a power terminal for connection to a power source and mounted on one of the housing halves and exterior to the enclosed space when the housing halves are mated, said device and power terminal comprising first and second electrical components, said housing including an assembly for conditioning supply of power from the power terminal to the component on mating of the housing halves, said assembly comprising:

a) an interconnection plug comprising first and second plug halves, said plug halves for mating with each other and when mated, making electrical connection with each other;

b) a flexible first power cable electrically and mechanically connected at a first end to the first plug half and at a second end, mechanically connected to the exterior of the first housing half, said first plug half dangling freely on the flexible power cable from the exterior of the first housing half; and c) a second power cable mechanically and electrically attached to the second plug half, wherein said second plug half is mechanically attached to the second housing half and accessible from the exterior of the second housing half, wherein the first power cable length and the attachment of the first power cable to the first housing half and the attachment of the second plug half to second housing half allows mating of the plug halves when the housing halves are mated, and wherein the first and second power cables and the first and second plug halves cooperatively form electrical connection between the first and second electrical components when the first and second plug halves are mated.

2. The housing of claim 1, wherein both electrical components are mounted on the same housing half.

3. The housing of claim 2, wherein the electrical components are mounted on the first housing half, wherein each plug half includes first and second electrical conductors, wherein the first and second electrical conductors of the first plug half are electrically connected to the first and second electrical components respectively, and wherein the first and second electrical conductors of the second plug half are electrically connected to each other.

4. The housing of claim 2, wherein the electrical components are mounted on the first housing half, wherein each plug half includes first and second electrical conductors which electrically interconnect with the corresponding conductors of the first and second mated plug halves, wherein the first and second electrical conductors of the first plug half are electrically connected to the first and second electrical components respectively, and wherein the first and second electrical conductors of the second plug half are accessible at the exterior of the second housing half for connection to an external switch.

5. The housing of claim 4, wherein the second plug half is mounted in the second housing half and accessible from the exterior of the housing, wherein the first housing half includes a flange carrying an aperture in alignment with the second plug half when the housing halves are mated, and wherein the plug halves are mated with the first plug half passing through the aperture.

6. The housing of claim 5, wherein the first plug half includes a separation-preventing feature, said feature cooperating with the flange to oppose separation of the housing halves from their mated position when the plug halves are mated.

* * * * *